United States Patent [19]

Scheiter, Jr.

[11] Patent Number: 5,161,557
[45] Date of Patent: Nov. 10, 1992

[54] BRUSHLESS VEHICLE WASHING APPARATUS

[75] Inventor: Lawrence F. Scheiter, Jr., Ballwin, Mo.

[73] Assignee: D & S Manufacturing Co., High Ridge, Mo.

[21] Appl. No.: 613,617

[22] Filed: Nov. 15, 1990

[51] Int. Cl.⁵ .............................................. B60S 3/04
[52] U.S. Cl. ................................... 134/57 R; 134/123
[58] Field of Search ............... 134/45, 123; 137/57 R, 137/58 R

[56] References Cited

U.S. PATENT DOCUMENTS

| | | | |
|---|---|---|---|
| 2,896,644 | 7/1959 | Emanuel | 134/123 X |
| 3,459,203 | 8/1969 | Pritchard | 134/123 |
| 3,533,422 | 10/1970 | Alimanestiano | 134/45 |
| 3,545,459 | 12/1970 | Phillips | 134/123 |
| 3,573,862 | 4/1971 | Brown | 134/123 X |
| 3,578,775 | 5/1971 | McMillen | 134/45 |
| 3,656,691 | 4/1972 | Norstrand | 239/284 |
| 3,658,590 | 4/1972 | Huebner et al. | 134/123 X |
| 3,726,293 | 4/1973 | Padek | 134/45 |
| 3,731,332 | 5/1973 | Bernardi | 15/21 |
| 3,747,151 | 7/1973 | Takeuchi | 15/21 E |
| 3,759,275 | 9/1973 | Walters | 134/45 |
| 3,763,822 | 10/1973 | Thompson | 118/73 |
| 3,786,823 | 1/1974 | Wiley | 134/45 |
| 3,793,663 | 2/1974 | Lieffring | 15/21 D |
| 3,822,430 | 7/1974 | Larson | 15/21 R |
| 3,854,054 | 12/1974 | Conn, Jr. | 307/41 |
| 3,908,219 | 9/1975 | Chapman et al. | 15/21 D |
| 3,934,297 | 1/1976 | Hanna | 15/53 |
| 3,996,948 | 12/1976 | Wiley | 134/45 |
| 4,104,756 | 8/1978 | Gasser et al. | 15/97 |
| 4,112,533 | 9/1978 | Brager | 15/53 A |
| 4,196,486 | 4/1980 | Capra | 15/53 A |
| 4,202,072 | 5/1980 | Gonzales | 15/302 |
| 4,288,255 | 9/1981 | Burger | 134/6 |
| 4,301,566 | 11/1981 | Weigele | 15/53 A |
| 4,305,174 | 12/1981 | Pyle et al. | 15/53 A |
| 4,450,600 | 5/1984 | Shelstad | 15/53 A |
| 4,562,848 | 1/1986 | Messing et al. | 134/123 |
| 4,587,688 | 5/1986 | Gougoulas | 15/316 R |
| 4,715,079 | 12/1987 | Kekewich et al. | 15/97 B |
| 4,715,391 | 12/1987 | Scheller | 134/57 R |
| 4,716,916 | 1/1988 | Hodge | 134/123 |
| 4,777,688 | 10/1988 | Seamster, Jr. | 15/53 A |
| 4,857,113 | 8/1989 | Hodge | 134/32 |
| 4,865,058 | 9/1989 | Crotts et al. | 134/45 |
| 4,878,262 | 11/1989 | Stufflebeam et al. | 15/53 B |
| 4,935,982 | 6/1990 | Ennis | 15/53 AB |
| 4,946,513 | 8/1990 | Del Prato et al. | 134/18 |
| 4,981,523 | 1/1991 | Larson et al. | 134/45 X |

FOREIGN PATENT DOCUMENTS

760256  6/1967  Canada .............................. 134/123

Primary Examiner—Philip R. Coe
Attorney, Agent, or Firm—Senniger, Powers, Leavitt & Roedel

[57] ABSTRACT

A brushless vehicle washing apparatus for washing a vehicle includes a gantry and sprayers carried by the gantry for directing jets of liquid against the exterior surfaces of the vehicle for cleaning the exterior surfaces. Some of the sprayers are oriented for directing their liquid jets generally in a first direction with respect to the gantry. The gantry is supported on arch-shaped supports for travel lengthwise of the vehicle, the supports including a middle section and opposite end sections. The supports hold the gantry in a first orientation in the middle section such that the liquid jets of the first sprayers are directed generally downwardly against top surfaces of the vehicle. The gantry is held at the end sections of the supports in a second orientation wherein the liquid jets of the sprayers are directed generally horizontally against the end exterior surfaces of the vehicle.

8 Claims, 6 Drawing Sheets

BRUSHLESS VEHICLE WASHING APPARATUS

BACKGROUND OF THE INVENTION

This invention relates generally to vehicle washing apparatus and more particularly to a brushless vehicle washing apparatus.

In the past brushless vehicle washing apparatus has not been able to satisfactorily clean the grime formed on front and rear ends of vehicles. The front ends of vehicles accumulate dirt, tar, oil and the like thrown up from the road by other vehicles and the same materials thrown up by the vehicle's own rear wheels accumulate on its rear ends. Existing brushless apparatus fails to direct a sufficient cleaning force against these critical areas. Moreover, many brushless apparatus require a relatively long tunnel through which the vehicle moves during cleaning. Therefore, such apparatus is not available for installation in smaller areas such as a garage bay, and is not ideally suited for unattended operation.

SUMMARY OF THE INVENTION

Among the several objects and features of the present invention may be noted the provision of brushless vehicle washing apparatus capable of complete automatic vehicle cleaning in a minimum amount of space such as in a standard garage bay; the provision of apparatus in which sprayers for all surfaces of the vehicle are incorporated on a single moving component; the provision of apparatus which generally follows the contour of the vehicle during its operation; the provision of such an apparatus which can concentrate cleansing streams of liquid on portions of the vehicle where grime is concentrated; the provision of such an apparatus which can detect objects in its path and stop its motion; and the provision of such an apparatus which is economical to manufacture.

Generally, a brushless vehicle washing apparatus constructed according to the principles of the present invention comprises carriage means for carrying sprayer means directing jets of liquid against exterior surfaces of a vehicle to be cleaned. The sprayer means includes first sprayers oriented for directing their liquid jets in a first direction with respect to the carriage means. Support means for supporting the carriage means for travel thereon lengthwise of the vehicle includes a middle section and opposite end sections. The support means is adapted to support the carriage means in a first orientation at the middle section in which the liquid jets of the first sprayers are directed generally downwardly against a top surface of the vehicle, and adapted to support the vehicle in a second orientation at the end sections in which the liquid jets of the first sprayers are directed generally horizontally against end exterior surfaces of the vehicle.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 2:
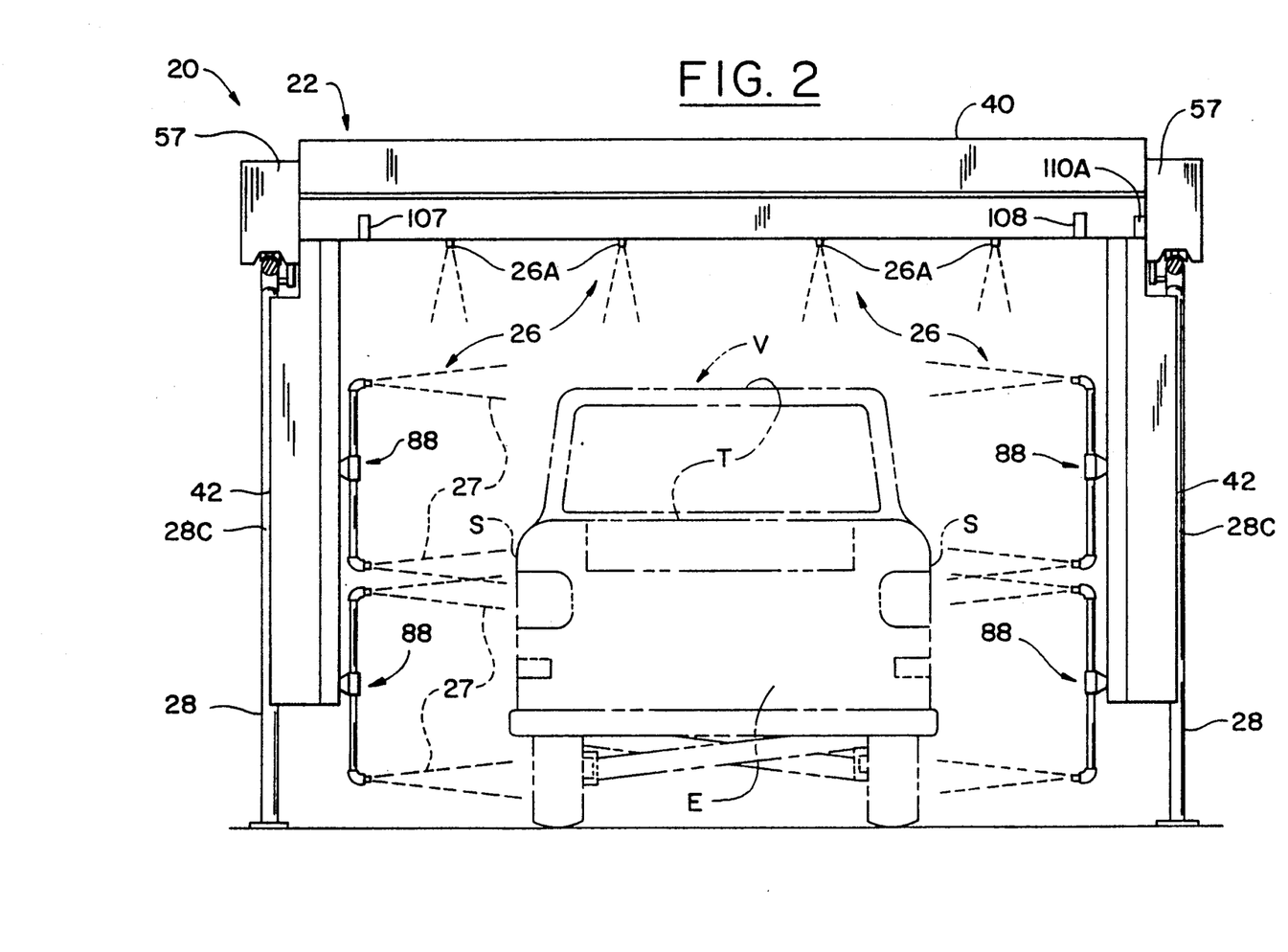
FIG. 2 is an end section of the vehicle washing apparatus taken in the plane including line 2—2 of FIG. 1.

Brushless vehicle washing apparatus constructed according to the principles of the present invention, indicated generally at 20, includes a carriage means or gantry 22 supported on support means 24 for travel on the support means lengthwise of a vehicle V to be cleaned. Sprayer means 26 carried on the gantry 22 directs jets of liquid 27 against the exterior surfaces of the vehicle. The sprayer means 26 includes first sprayers 26A oriented for directing their liquid jets 27 generally in a first direction with respect to the gantry 22. The support means includes a pair of tubular, arch-like support members 28 in laterally spaced relation (FIG. 2). Each support member is made of galvanized steel and includes a horizontally extending middle section 28A, vertically extending opposite end sections indicated at 28B and 28C, respectively, and curved connecting sections 28D joining the middle and end sections. The end sections 28B, 28C terminate at their bottoms in plates 30 which provide a flat surface for securing the support member 28 to the ground. Antifreeze (not shown) is circulated through the support members 28 to prevent the formation of ice on the support members in subfreezing weather.

Figures 4, 5:
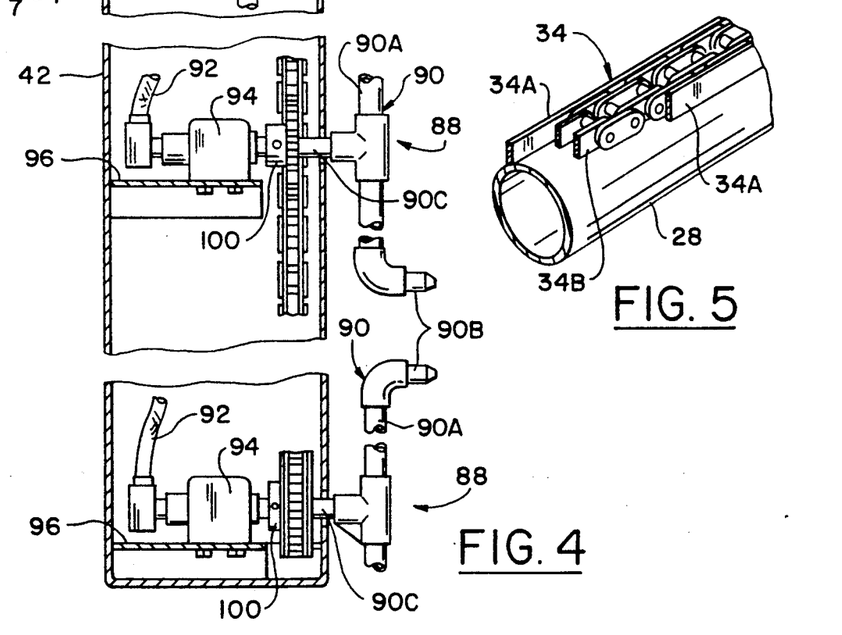
FIG. 4 is as fragmentary section taken in along line 4—4 of FIG. 3.
FIG. 5 is a fragmentary perspective view of a portion of a support member of the apparatus and a track mounted thereon.

The support members 28 are adapted to support the gantry 22 in a first orientation (shown in solid lines in FIG. 1) in the middle sections 28A wherein the liquid jets 27 of the first sprayers 26A are directed generally downwardly against generally upwardly facing top surfaces T of the vehicle. As shown in phantom in FIG. 1, the support members 28 are also adapted to support the gantry 22 in a second orientation at the end sections 28B in which the liquid jets 27 of the first sprayers 26A are directed generally horizontally against longitudinally outward facing end surface E of the vehicle. The support members 28 are likewise adapted to support the gantry in its second orientation at the opposite end sections 28C. The gantry 22 is reoriented as it moves along the connecting sections 28D of the support members between the middle sections 28A and one of the end sections 28B, 28C from the first orientation to the second orientation. As shown in FIG. 5, track means, indicated generally at 34, on each support member 28 includes laterally spaced apart metal strips 34A welded on the support members and extending lengthwise of the support members from one end section 28B to the other end section 28C. The strips 34A define a channel for receiving a chain 34B anchored at either end to an adjustable mount 36 (FIGS. 8 and 9) which includes a threaded rod 36A attached to the end link of the chain. The rod 36A is received through a tab 36B projecting outwardly from the support member 28. The chain 34B may be tightened or loosened as required by turning a nut 36C on the rod 36A.

Figure 3:
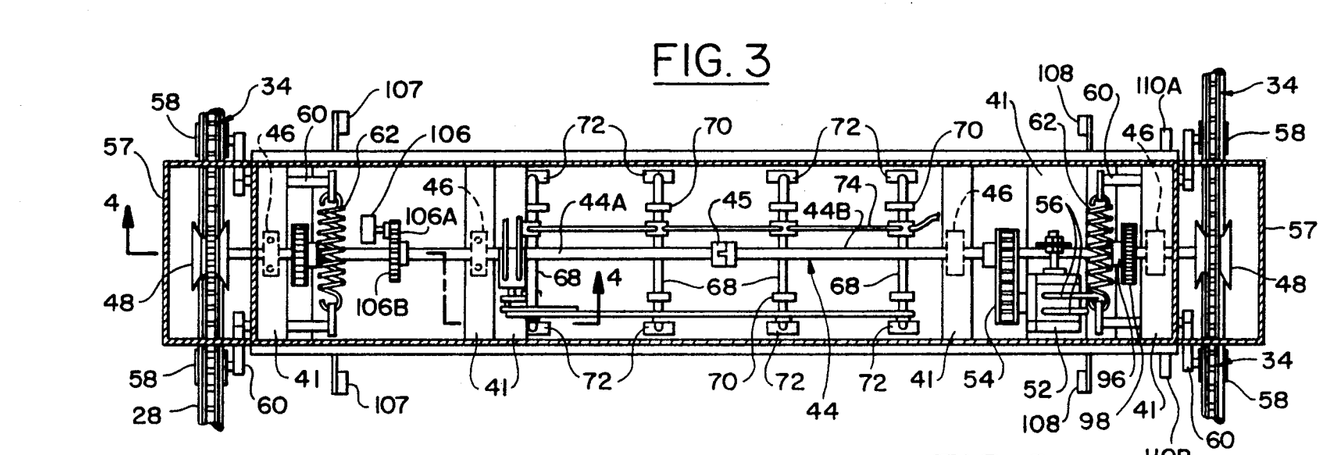
FIG. 3 is a fragmentary section taken in the plane including line 3—3 of FIG. 1.
Figures 7, 8, 9:
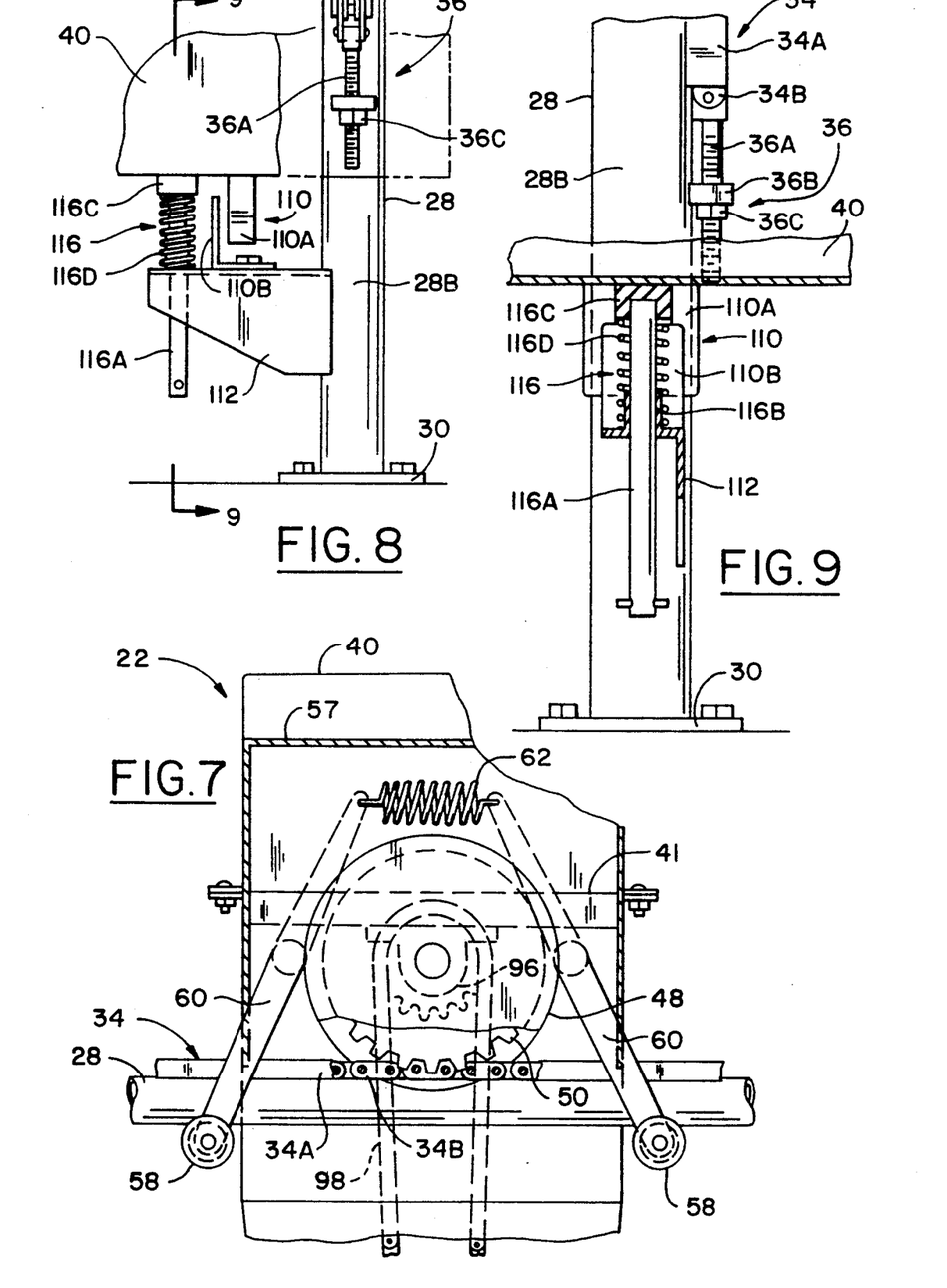
FIG. 7 is a fragmentary section taken in the plane including line 7—7 of FIG. 4.
FIG. 8 is a fragmentary side elevation of one end of a support member.
FIG. 9 is an end elevation taken from the perspective indicated by line 9—9 in FIG. 8.

Referring now to FIGS. 2 and 3, the gantry 22 includes a crosspiece 40 extending between the support members 28 and legs 42 depending from the laterally opposite ends of the crosspiece. The crosspiece 40 and legs 42 are constructed from sheets of stainless steel, and the crosspiece 40 includes internal frame members 41 for mounting the components of the apparatus 20 housed in the crosspiece. A laterally extending main shaft 44, including two shaft sections, indicated at 44A and 44B, respectively, which are connected together by couple 45, is housed in the crosspiece 40. The main shaft 44 is mounted for rotation about its longitudinal axis in blocks 46 attached to frame members 41. Flanged drive wheels 48 attached to either end of the main shaft 44 have teeth 50 which are engageable in the links of the chain 34B (FIG. 7), which serves as a track for guiding the movement of the gantry 22 along the support members. A first hydraulic motor 52 (broadly "drive means") bolted to one of the gantry crosspiece frame members 41 drives a chain 54 for turning the shaft 44. A pair of feed lines 56 connect the first motor 52 to the hydraulic fluid system H for reversible operation of the first motor to move the gantry 22 in either direction and from end-to-end of the support members 28. Hoods 57 made of stainless steel are attached to the laterally opposite ends of the gantry crosspiece 40 to cover the drive wheels 48. Two retainer wheels 58 are attached to crank arms 60 pivotally mounted on the gantry 22 at each lateral end of the crosspiece 40. As shown in FIG. 7, the wheels 58 engage the underside of the support member 28 generally under the drive wheel 48, and hold the drive wheel teeth 50 in engagement with the chain 34B as the gantry 22 travels along the support members. The ends of the crank arms 60 opposite the retainer wheels 58 are connected by a spring 62 so that the retainer wheels are allowed to move by pivoting on the crank arms to accomodate the curved connecting section 28D of the support member while maintaining sufficient counter pressure against the support member 28 to retain the drive wheel teeth 50 in the links of chain 34B.

Figure 6:
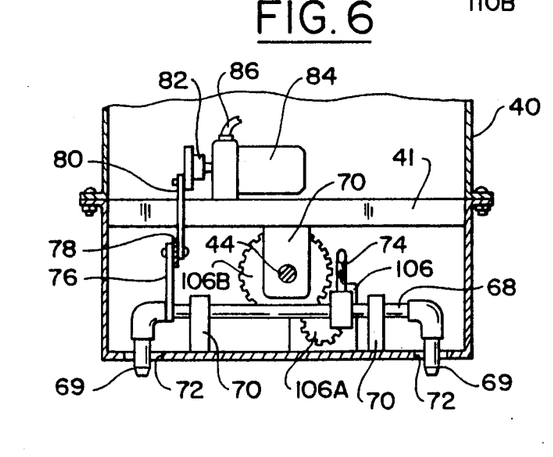
FIG. 6 is a fragmentary section taken in the plane including line 6—6 of FIG. 4.

Referring now to FIGS. 3, 4 and 6, the first sprayers 26A include a plurality of U-shaped manifolds 68 extending generally transversely of the gantry crosspiece 40 which are pivotally mounted in pillow blocks 70 on the crosspiece. Each end of the manifold 68 terminates in a nozzle 69 directed outwardly in a first direction from the gantry 22 through a laterally elongated slot 72 in the crosspiece 40. The manifolds 68 are connected by hoses 74 to a liquid supply for the apparatus 20. Means for oscillating the manifolds includes a tab 76 projecting outwardly from each manifold 68 adjacent one end of the manifold which is pivotally connected to a laterally extending rod 78 attached by a link 80 to a driveshaft 82 turned by a second hydraulic motor 84 mounted on a crosspiece frame member 41. The second hydraulic motor 84 is connected by feed lines 86 to the hydraulic system H and operates independently of the first hydraulic motor 52. The link 80 is eccentrically attached to the driveshaft 82 so that the rod 78 is driven back and forth along its length and the jets of liquid 27 emitted from the nozzles 69 are oscillated laterally, as illustrated in FIG. 4.

The sprayer means 26 also includes second, rotary sprayers 88 adapted to direct a jet of liquid 27 in a second direction with respect to the gantry 22 for cleaning laterally outwardly facing side surfaces S of the vehicle V (FIG. 2). Two rotary sprayers 88 are provided for each leg 42 of the gantry 22. As shown in FIG. 4, the rotary sprayers 88 include a manifold 90 having a U-shaped section 90A terminating in laterally outwardly directed nozzles 90B at either end, and a straight section 90C extending inwardly through a laterally inwardly facing panel of the leg 42. The straight section 90C and the U-shaped section 90A are in fluid communication, and hoses 92 connect the straight section of the manifold to the liquid supply system. The straight section 90C is mounted for rotation in a pillow block 94 bolted to a bracket 96 on the inside of the leg 42 (the rotational motion of the U-shaped section 90C being illustrated in FIG. 1). As best seen in FIGS. 4 and 7, sprocket gears 96 mounted on the main shaft 44 drive a chain 98 which is engaged in teeth of sprocket gears 100 attached to the straight sections 90C of each rotary sprayer 88. Thus, the rotation of the rotary sprayers 88 is directly linked to the movement of the gantry 22.

Control means comprising a controller 104 (FIG. 10) selectively activates and deactivates the first motor 52 for starting and stopping motion of the gantry 22 in a predetermined sequence. The controller used in the present embodiment is the C28H programmable controller unit manufactured by Omron Electronics, Inc of Japan and available in this country through its authorized division in St. Ann, Mo. The controller 104 is located off the gantry 22 and communicates through electrical lines carried by in an umbilical 105 also including washing liquid and hydraulic fluid lines. As shown in FIG. 3, a shaft encoder 106 (broadly "shaft encoder means") includes a gear 106A turned by a gear 106B mounted on the shaft 44. The encoder 106 generates a signal corresponding to the rotations of the shaft 44 which is sent to the controller 104 which determines the position of the gantry 22 based on the number of revolutions of the shaft from the starting position. Thus, the position of the gantry 22 on the support members 28 is constantly known by the controller 104 and the movement commands are initiated accordingly. Sensor means for detecting an object in the path of the gantry 22 includes a pair of photoelectric eyes 107 and light sources 108 projecting longitudinally outwardly from the crosspiece 40. When the beam of light from the source 108 is broken by the presence of an object in the path of the gantry 22, the sensor means generates a signal sent to the controller 104 which is responsive to the signal to stop the motion of the gantry in the direction of the obstruction. Therefore, if a vehicle is not properly positioned in the apparatus 20, that is, a portion of the vehicle remains between the end sections 28B or 28C, of the support members 28 when operation of the apparatus is initiated, its presence will be detected and a collision avoided.

End proximity sensor means, indicated generally at 110, is provided to detect that the gantry 22 is approaching the lower portion of the end sections 28B, 28C of the support members 28. The sensor means 110 includes a first tab 110A mounted on the right end of gantry crosspiece 40 (as seen in FIG. 3), and a second tab 110B mounted on a bracket 112 attached to the support member 28. Lateral registration of the first and second tabs, 110A, 110B, as shown in FIG. 8, induces a signal indicative of the close proximity of the gantry 22 to the lower end of the end sections 28B which is sent to controller 104. The motion of the gantry 22 toward the lower end of the end sections 28B is stopped by the controller 104 in response to the signal. In normal operation, the controller 104 will stop the gantry 22 before the first and second tabs 110A, 110B move into registration with each other. Thus, the end proximity sensor means 110 provides a backup to the controller program to assure that the gantry 22 does not travel too far toward the lower portion of the end sections 28B, 28C.

The bracket 112 at the lower end of each end section 28B, 28C also holds resilient means 116 for supporting the gantry 22 at the end sections. As shown in FIG. 9, the resilient means 116 includes a rod 116A received through a tubular passage 116B formed in the bracket 116. The rod 116A has a stop 116C made of rubber or like material at its upper end for engaging the gantry crosspiece 40. The rod 116A is biased upwardly by a compression spring 116D disposed around the portion of the rod above the bracket 112. As the gantry 22 moves toward the lower portion of the end sections 28B, 28C at one end of the support members 28, the crosspiece 40 engages the stops 116C of the resilient means located at that end and compresses the spring 116D. The spring 116C applies an upwardly directed counterforce which tends to support the weight of the gantry 22. Therefore, when the gantry 22 is stopped and its direction reversed at the end sections 28B, 28C, the inertial forces on the drive wheels 48 associated with reversing the direction of the gantry to climb up the end sections 28B, 28C, is reduced.

Figure 1:
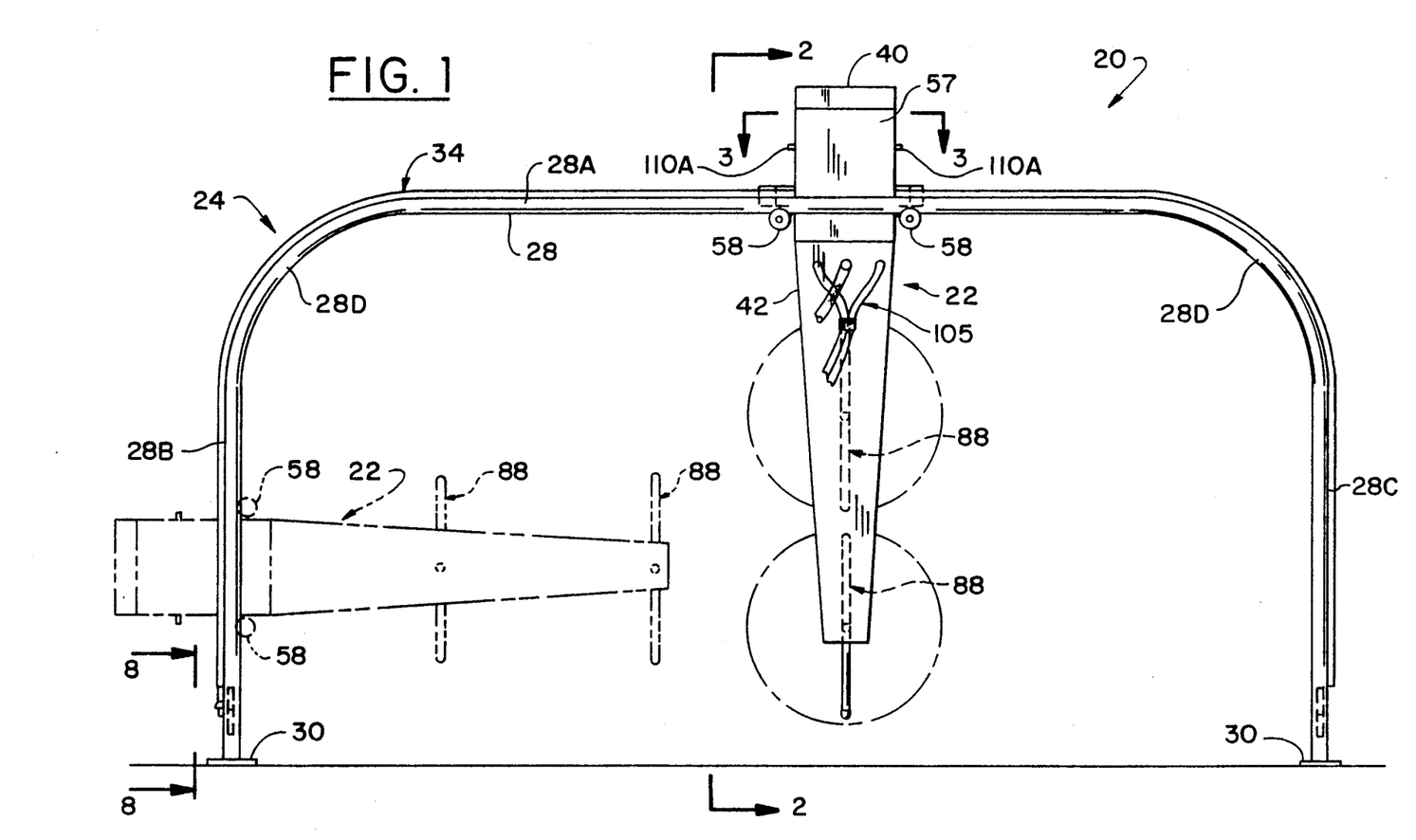
FIG. 1 is a side elevation of vehicle washing apparatus constructed according to the principles of the present invention.
Figure 10:
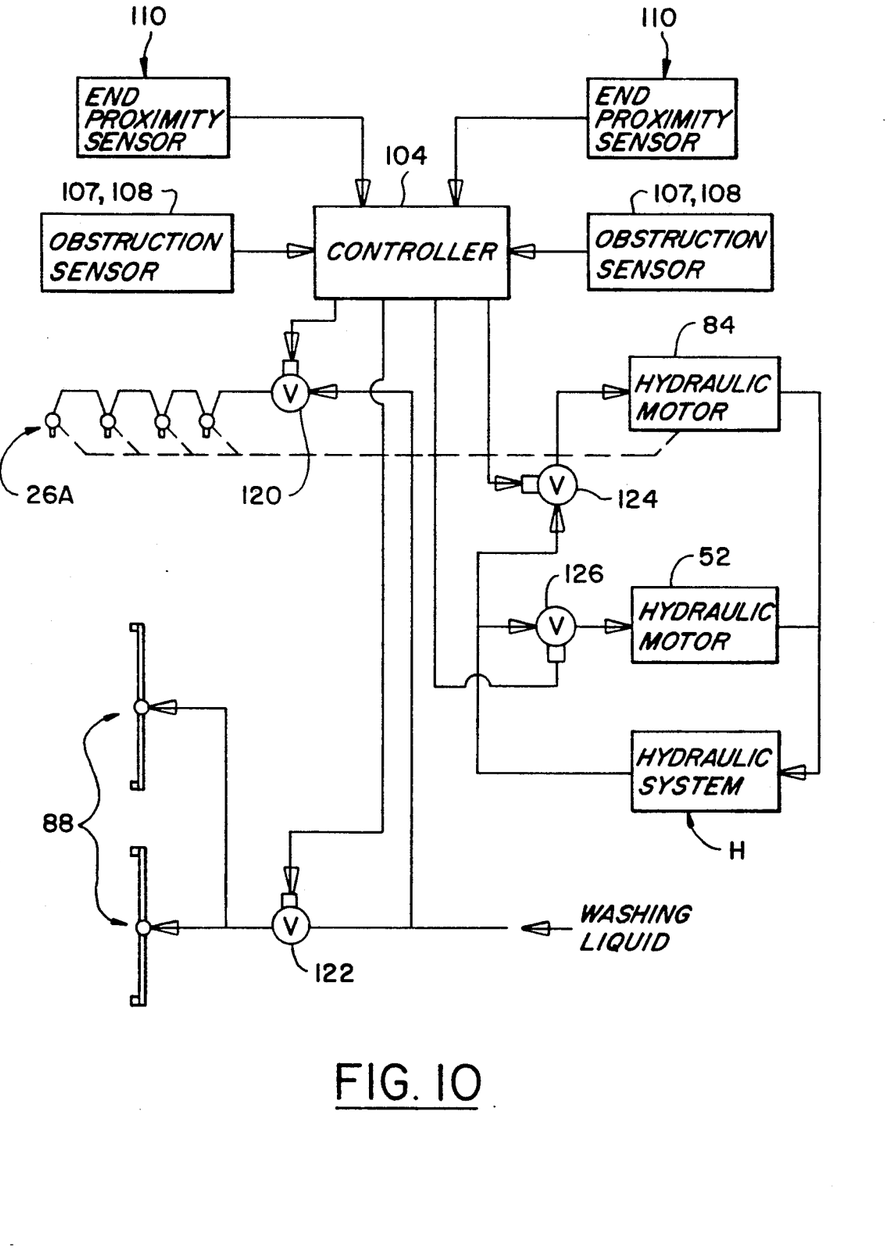
FIG. 10 is a schematic of the control system of the apparatus.

The method of the present invention is embodied in following description of the operation of the vehicle washing apparatus 20. Reference may be had to FIG. 10 which shows the control system in schematic fashion to facilitate an understanding of the operation of the apparatus. The gantry 22 is initially located in the middle sections 28A of the support members 28, as shown in FIG. 1. After the vehicle is positioned between the support members 28, the controller 104 opens valves 120 and 122 allowing liquid to flow to both the oscillating sprayers 26A and the rotary sprayers 88. Thus, jets of liquid 27 from the oscillating sprayers 26A are directed generally downwardly against the top surfaces T of the vehicle and jets of liquid from the rotary sprayers 88 are directed generally laterally against the side surfaces S of the vehicle. The controller 104 opens a valve 124 to activate the second motor 84 for oscillation of the first sprayers 26A. Another valve 126 is opened on command of the controller 104 to activate the first hydraulic motor 52 for turning the shaft 44 and moving the gantry 22 toward the left end (as seen in FIG. 1) of the support members 28. It is to be understood that the initial direction of motion is not critical to the invention. The activation of the first motor 52 to turn the shaft 44 also initiates rotation of the rotary sprayers 88.

The drive wheels 48 and retainer wheels 58 hold the gantry 22 on the support members 28 such that the legs 42 of the gantry extend generally perpendicularly to the longitudinal extension of the support members everywhere along the support members. Thus, as the gantry 22 traverses the curved connecting sections 28D from the middle sections 28A to the end sections 28B, the gantry swings inwardly from its first orientation in which the gantry legs 42 extend downwardly, to its second orientation in which the legs extend generally horizontally. At the same time, the direction of the liquid jets 27 emitted from the oscillating sprayers 26A changes from generally downward for impacting the top surfaces T of the vehicle to generally horizontally for impacting the end surfaces E of the vehicle. As the gantry 22 moves downwardly on the end sections 28B it engages the stops 116C of the resilient support means 116 so that a portion of the weight of the gantry is supported by the resilient means.

The controller 104, which monitors the position of the gantry 22 by counting rotations of the shaft through signals sent from the shaft encoder 106, closes the valve 126 to shut down the first motor 52 and stop the motion of the gantry 22 and rotation of the rotary sprayers 88 when the gantry reaches a predetermined lowest position on the end sections 28B. In this position the jets 27 of the oscillating sprayers 26A impact the lowest outwardly facing end surface E of the vehicle, on which dirt and the like is usually most heavily concentrated. The position of the gantry 22 is held for a predetermined period of time (e.g., 10 seconds) so that the jets 27 from the oscillating sprayers 26A may thoroughly clean the end surfaces E of the vehicle. In addition, the controller 104 closes valve 122 such that the liquid jets 27 from the rotary sprayers are shut off, increasing the liquid pressure of the jets from the oscillating nozzles 26A. The controller 104 may be programmed to slow the gantry's rate of travel everywhere along the end sections 28B, 28C to direct a greater volume of cleansing liquid on all portions of the end surfaces E. The exposure duration and liquid pressure provides maximum cleaning at the front and rear end surfaces E of the vehicle. Moreover, it is at the ends of the support members 28 that the liquid jets must travel the farthest to impact the exterior surfaces of the vehicle. Extended exposure of the end surfaces E to the jets 27 also compensates for a lessening of the impact force of the jets on the end surfaces.

When the predetermined time for holding the gantry 22 at the end sections 28B has elapsed, the controller again opens valve 126, reactivating the first motor 52, but this time for motion in the opposite direction (to the right as seen in FIG. 1). The valve 122 connecting the rotary sprayers to the liquid supply is also reopened. The gantry 22 travels up the end sections 28B and traverses the corner sections 28D, reorienting itself again to its vertical position ("first orientation") as it moves across the middle sections 28A. The gantry 22 is yet again reoriented as it travels along the curved connecting sections 28D to the end sections 28C at the opposite end of the support members so that the oscillating sprayers 26A impact the opposite end surfaces E of the vehicle. At this end of the support members 28, the operation of the apparatus 20 is the same as described for the other end, including specifically pausing to apply maximum cleaning force to the end surfaces.

The controller 104 may be programmed to cycle the position of the gantry 22 from end to end as required. For instance, a four cycle wash sequence may be used, in which the gantry 22 first moves from its home position in the middle sections 28A of the support members 28 toward the end sections 28B with the sprayers 26 wetting the exterior vehicle surfaces with a relatively high concentrate detergent (e.g., having a water to detergent ratio of 10:1) at low fluid pressure. In each cycle, the gantry moves from end to end of the support members 28 and back to its home position. Following the pre-soak the gantry 22 makes a second cycle, spraying a solution of detergent of lower concentration (e.g., 100:1) at a higher pressure onto the vehicle. It is in the second cycle that the rate of travel of the gantry is slowed at the end sections for concentrating cleaning force on the end surfaces of the vehicle. A high pressure rinse follows which may include a spray wax. A final rinse pass, at lower pressure, may use deionized water to prevent the formation of spots on the vehicle surfaces as they dry. It is to be understood that other washing sequences may be used and still fall in the scope of the present invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Brushless vehicle washing apparatus for washing a vehicle having exterior surfaces including generally upwardly facing top surfaces, generally laterally outwardly facing side surfaces and generally longitudinally outwardly facing end surfaces, the apparatus comprising:

carriage means;

sprayer means supported on said carriage means for directing jets of liquid against the exterior surfaces of the vehicle for cleaning the exterior surfaces, said sprayer means including first sprayers oriented for directing their liquid jets generally in a first direction with respect to said carriage means;

support means supporting said carriage means for travel thereon lengthwise of the vehicle, and support means comprising a pair of arch-like support members in laterally spaced relation, said support members supporting said carriage means between them and having track means thereon for guiding the movement of said carriage means, the support members having a middle section, opposite end sections and curved connecting sections joining the end sections with the middle section, said carriage means being reoriented between a orientation and a second orientation as it travels along the connecting section;

said support means being adapted to support said carriage means in a first orientation at said middle section wherein the liquid jets of the first sprayers are directed generally downwardly for impacting the top surfaces of the vehicle, and said support means being adapted to support said carriage means in a second orientation at said end sections wherein the liquid jets of the first sprayers are directed generally horizontally for impacting the end exterior surfaces of the vehicle;

drive means mounted on said carriage means for moving said carriage means along said support members, said drive means being adapted to move said carriage means a different speeds along said support members; and control means for controlling movement of said carriage means in a first direction toward a first of the end sections of the support members, and movement of said carriage means in a second direction toward a second of said end sections of the support members, said control means slowing the speed of said carriage means along predetermined portions of the support members, and said control means holding the position of said carriage means at the end sections before reversing direction.

2. Vehicle washing apparatus as set forth in claim 1 further comprising sensor means for detecting an object in the path of said carriage means, said sensor means being adapted to generate a signal upon detection of an obstruction in the path of said carriage means, said control means being responsive to said signal to stop the motion of said carriage means in the direction of the obstruction.

3. Vehicle washing apparatus as set forth in claim 1 further comprising end proximity sensor means generally located at the end sections of the support members for detecting the proximity of said carriage means to the ends of the support members and generating a signal indicative thereof, said control means being responsive to said signal to stop the motion of said carriage means in the direction of the end of the support members.

4. Vehicle washing apparatus as set forth in claim 1 wherein said sprayer means further comprises rotary sprayers adapted to direct jets of liquid in a second direction with respect to said carriage means, the rotary sprayers being driven by said drive means and interlocked with the movement of said carriage means such that the rotary sprayers are driven to rotate only when said carriage means is moving.

5. Vehicle washing apparatus as set forth in claim 4 further comprising resilient means mounted on the support members for supporting said carriage means at the end sections of said support members.

6. Brushless vehicle washing apparatus for washing a vehicle having exterior surfaces including generally upwardly facing top surfaces, generally laterally outwardly facing said surfaces and generally longitudinally outwardly facing end surfaces, the apparatus comprising:

carriage means;

sprayer means supported on said carriage means for directing jets of liquid against the exterior surfaces of the vehicle for cleaning the exterior surfaces, said sprayer means including first sprayers oriented for directing their liquid jets generally in a first direction with respect to said carriage means;

support means supporting said carriage means for travel thereon lengthwise of the vehicle, said support means comprising a pair of arch-like support members in laterally spaced relation, said support members supporting said carriage means between them and having track means thereon for guiding the movement of said carriage means, the support members having a middle section, opposite end sections and curved connecting sections joining the end sections with the middle section, said carriage means being reoriented between a first orientation and a second orientation as it travels along the connection section;

said support means being adapted to support said carriage means in said first orientation at said middle section wherein the liquid jets of the first sprayers are directed generally downwardly for impacting the top surfaces of the vehicle, and said support means being adapted to support said carriage means in said second orientation at said end sections wherein the liquid jets of the first sprayers are directed generally horizontally for impacting the end exterior surfaces of the vehicle;

drive means mounted on said carriage means for moving said carriage means along said support members, said drive means being adapted to move said carriage means at different speeds along said support members;

control means for controlling movement of said carriage means in a first direction toward a first of the end sections of the support members, and movement of said carriage means in a second direction toward a second of said end sections of the support members, said control means being adapted to hold the position of said carriage means at end section before reversing direction;

said sprayer means comprising rotary sprayers adapted to direct jets of liquid in a second direction with respect to said carriage means, the rotary sprayers being driven by said drive means such that the rotation of the rotary nozzles coincides with the movement of said carriage means;

said carriage means comprising a crosspiece extending between the support members and legs depending from the laterally opposite ends of the crosspiece, the first sprayers being mounted on the crosspiece and the rotary nozzles being mounted on the legs, and a laterally extending shaft having sprocket wheels engaged in said track means of the support members at the laterally opposite ends of the crosspiece, and wherein said drive means comprises a hydraulic motor mounted on said crosspiece for turning the laterally extending shaft.

7. Vehicle washing apparatus as set forth in claim 6 wherein said control means comprises shaft encoder means for generating a signal representative of the location of said carriage means on the support members.

8. Brushless vehicle washing apparatus for washing a vehicle having exterior surfaces including generally upwardly facing top surfaces, generally laterally outwardly facing side surfaces and generally longitudinally outwardly facing end surfaces, the apparatus comprising:

carriage means;

sprayer means supported on said carriage means for directing jets of liquid against the exterior surfaces of the vehicle for cleaning the exterior surfaces, said sprayer means including first sprayers oriented for directing their liquid jets generally in a first direction with respect to said carriage means;

support means supporting said carriage means for travel thereon lengthwise of the vehicle, said support means having a middle section and opposite end sections, said carriage means being reoriented between a first orientation and a second orientation as it travels along the connecting section;

said support means being adapted to support said carriage means in said first orientation at said middle section wherein the liquid jets of the first sprayers are directed generally downwardly for impacting the top surfaces of the vehicle, and said support means being adapted to support said carriage means in said second orientation at said end sections wherein the liquid jets of the first sprayers are directed generally horizontally for impacting the end exterior surfaces of the vehicle;

drive means mounted on said support means for moving said carriage means along said support means, said drive means being adapted to move said carriage means at different speeds along said support means;

control means for controlling movement of said carriage means in a first direction toward a first of the end sections of said support means, and movement of said carriage means in a second direction toward a second of said end sections of said support means, said control means slowing the speed of said carriage means along predetermined portions of the support members.

* * * * *